(12) United States Patent
Leeb (10) Patent No.: US 10,561,061 B2
(45) Date of Patent: *Feb. 18, 2020

(54) DEVICE FOR SPREADING LIQUID AND/OR SOLID ACTIVE AGENTS AND METHOD FOR CONTROLLING SUCH A DEVICE

(71) Applicant: HORSCH LEEB Application Systems GmbH, Oberpöring (DE)

(72) Inventor: Theodor Leeb, Wallersdorf (DE)

(73) Assignee: HORSCH LEEB Application Systems GmbH, Oberporing (DE)

( * ) Notice: Subject to any disclaimer, the term of this patent is extended or adjusted under 35 U.S.C. 154(b) by 71 days.

This patent is subject to a terminal disclaimer.

(21) Appl. No.: 15/057,209

(22) Filed: Mar. 1, 2016

(65) Prior Publication Data

US 2016/0255769 A1 Sep. 8, 2016

(30) Foreign Application Priority Data

Mar. 2, 2015 (DE) .......................... 10 2015 102 975

(51) Int. Cl.
*A01C 23/00* (2006.01)
*A01M 7/00* (2006.01)
*A01C 23/04* (2006.01)

(52) U.S. Cl.
CPC .......... *A01C 23/007* (2013.01); *A01C 23/008* (2013.01); *A01C 23/047* (2013.01); *A01M 7/0057* (2013.01)

(58) Field of Classification Search
CPC .............. A01M 7/0042; A01M 7/0053; A01M 7/0057; A01C 23/007; A01C 23/008; A01C 23/047; B05B 1/20–207; B05B 13/005

(Continued)

(56) References Cited

U.S. PATENT DOCUMENTS 6,131,821 A 10/2000 Nejsum
6,315,218 B1 * 11/2001 Guesdon ............. A01M 7/0053
239/159

(Continued)

FOREIGN PATENT DOCUMENTS

DE 1833453 6/1961
DE 4140254 6/1993

(Continued)

OTHER PUBLICATIONS

Anthonis et al., Implementation of an Active Horizontal Suspension on a Spray Boom, American Society of Agricultural Engineers, 2000, pp. 213-220, vol. 43(2).

(Continued)

*Primary Examiner* — Cody J Lieuwen
(74) *Attorney, Agent, or Firm* — Erickson Kernell IP, LLC; Mark C. Young (57) ABSTRACT

Disclosed is a device for spreading liquid and/or solid active agents as well as a method for controlling the device. The device comprises a carrier vehicle, at least one boom arranged pivotably about a rotation axis, and at least one sensor arrangement for detecting an angular velocity and/or an angular position of the boom about the rotation axis in relation to a reference plane. A control unit processes output signals of the sensor arrangements to control signals for an actuator for the purpose of pivoting the boom. Two actuators or a double acting actuator provide an actuating connection between the carrier vehicle and the pivotable boom, wherein the actuator has one active actuating side for each of the two pivoting directions of the boom, which active actuating side is electromagnetically or electromotively actuatable.

11 Claims, 4 Drawing Sheets

(58) Field of Classification Search
USPC .................................................. 239/159–170
See application file for complete search history.

(56) References Cited

U.S. PATENT DOCUMENTS

| | | | |
|---|---|---|---|
| 8,235,231 B2 | 8/2012 | Schneider et al. | |
| 9,151,013 B2 | 10/2015 | Glitza | |
| 2007/0289298 A1* | 12/2007 | Thompson | A01M 7/0053 60/469 |
| 2009/0069987 A1 | 3/2009 | Omelchenko et al. | |
| 2009/0082930 A1 | 3/2009 | Peters | |
| 2009/0118892 A1 | 5/2009 | Yamashita et al. | |
| 2012/0211301 A1 | 8/2012 | Clark et al. | |
| 2012/0215410 A1 | 8/2012 | McClure et al. | |
| 2013/0277442 A1* | 10/2013 | Ballu | A01M 7/0057 239/1 |
| 2014/0196996 A1* | 7/2014 | Ito | B05B 13/005 188/266.2 |
| 2015/0305232 A1* | 10/2015 | Rosenbaum | A01C 23/047 239/164 |

FOREIGN PATENT DOCUMENTS

| | | |
|---|---|---|
| DE | 19962687 C2 | 4/2002 |
| DE | 102004033900 A1 | 7/2005 |
| DE | 102004004491 A1 | 8/2005 |
| DE | 102007025751 | 12/2008 |
| DE | 102010035291 A1 | 3/2012 |
| DK | 2559332 T3 * | 3/2015 ........ A01M 7/0057 |
| EP | 0157592 | 10/1985 |
| EP | 1416095 A1 | 5/2004 |
| EP | 1444894 A1 | 8/2004 |
| EP | 2123588 A1 | 11/2009 |
| EP | 2308755 A2 | 4/2011 |
| EP | 2042276 B1 | 11/2011 |
| EP | 2511678 A1 | 10/2012 |
| EP | 2591657 A1 | 5/2013 |
| FR | 2270774 | 12/1975 |
| FR | 2779031 | 12/1999 |
| GB | 1380029 A | 1/1975 |
| GB | 2252295 A | 8/1992 |
| JP | 06178603 A | 6/1994 |
| JP | 2004321135 A | 11/2004 |
| JP | 200829261 A | 2/2008 |
| JP | 2008129813 A | 6/2008 |
| JP | 201130464 A | 2/2011 |
| WO | 0036376 A1 | 6/2000 |
| WO | 0134511 A1 | 5/2001 |
| WO | 2004041446 | 5/2004 |
| WO | 2007046980 A2 | 4/2007 |
| WO | 2010121713 A1 | 10/2010 |

OTHER PUBLICATIONS

Kölner Labor für Baumaschinen (KLB)—Deutsch/Cologne Laboratory for Construction Machinery (KLB)—German, http://www.mobilearbeitsmaschine.de:80/home.html, Feb. 2012, and Google Translate English translation.

Handbuch der Mess—und Automatisierungstechnik im Automobil/ Handbook of the Measuring and automation technology in the automobile Vehicle electronics, vehicle mechatronics 2nd, completely edited edition with 330 illustrations, Springer, 2006 Germany.

Khot et al., Sensor fusion for improving the estimation of roll and pitch for an agricultural sprayer, ScienceDirect, Biosystems Engineering 101 (2008), pp. 13-20, www.elsevier.com/locate/issn/ 15375110.

Ooms et al., Measurements of the horizontal sprayer boom movements by sensor date fusion, Elsevier Science, Computers and Electronics in Agriculture, 33 (2002), pp. 139-162, www.elsevier.com/locate/compag.

Tahmasebi et al., Active Force Control Applied to Spray Boom Structure, Applied Mechanics and Materials, vol. 315 (2013) pp. 616-620.

Wikipedia, Sensor data fusion, https://de.wikipedia.org/w/index.php?title-Sensordatenfusion&oldid=107055308; original and translation.

* cited by examiner

DEVICE FOR SPREADING LIQUID AND/OR SOLID ACTIVE AGENTS AND METHOD FOR CONTROLLING SUCH A DEVICE

CROSS-REFERENCE TO RELATED APPLICATIONS

This application claims priority from German Application No. DE 10 2015 102 975.8 filed Mar. 2, 2015, the contents of which are incorporated herein by this reference.

FIELD OF THE INVENTION

The present invention relates to a device for spreading liquid and/or solid active agents. The invention furthermore relates to a method for controlling such a device.

BACKGROUND OF THE INVENTION

Field sprayers and spray booms hitched to work machines, such as tractors, in some cases have very large working widths of more than 20 meters. Such wide spray booms are folded in for transport purposes. Symmetrical cantilevered arms of several meters length are located in the field on both sides of the work machine, which cantilevered arms have a varying spacing from the ground according to surface conditions and field relief. Since the downward-directed nozzles for spreading the spraying agent, which nozzles are arranged on the cantilevered arms, each have a defined spray cone, varying the spacing of the nozzles to the ground results in an uneven covering of the field with spraying agent. In addition, the danger of the spraying agent drifting greatly increases with the distance of the spray nozzles from the ground increasing, since even slight air movements negatively affect the finely dispersed drops.

With increasing cantilever dimensions and the associated working width there is therefore a necessity to guide the spray boom at as uniform a spacing from the ground as possible, because minimal inclines of the spray boom will lead to large spacing differences of the nozzles to the ground.

In this context, it is known to suspend a spray boom from a carrier vehicle to be rotatable or pivotable about at least one axis of rotation about a pivot point. The rotation or pivot axis in this instance preferably runs parallel to the longitudinal axis of the carrier vehicle. In order to ensure an even spreading of the spraying agent, the spacing between the top surface of the growth and the spray nozzles must be constantly controlled to a defined spacing. On horizontal agricultural fields, this can generally be achieved by self-leveling, in which the spray boom aligns itself in the horizontal plane with the center of gravity of the spray boom being located below the pivot point and the spray boom being suspended, for instance, to be freely and swingingly rotatable. The desired effect will not occur, however, for agricultural fields running along a slope.

In order to constantly control to a defined spacing, the spacing between the top surface of the growth for agricultural fields running in any plane and the spray nozzles arranged on a spray boom pivotably suspended about a pivot point, it is therefore known to pivot the spray boom, which is, for instance, raised to a desired spacing from the ground, about a pivot axis running through a central pivot point such that the spacing is optimized over the entire working width. For this purpose, an alignment changing torque has to be exerted on the spray boom about a pivot axis running through a pivot point. This is carried out by means of at least one actuator, which transmits, at least as required, a force or a force couple effecting an alignment changing torque about a pivot axis from the carrier vehicle onto the spray boom in order to change the alignment of the spray boom.

This alignment changing torque accelerates the spray boom in a desired target rotational direction. Without countermeasures, the spray boom would continue to rotate about the pivot axis even after the impact of the alignment changing torque has ended, since the spray boom would retain its angular momentum due to the mass moment of inertia. In order to decelerate the spray boom, a braking torque in opposite to the previous alignment changing torque therefore has to be induced. This braking torque counteracts the rotary movement initiated by the alignment changing torque and thus dampens the system of the spray boom rotatably suspended about the central pivot point.

Up to now, mechanical dampeners, which are arranged between the carrier vehicle and the spray boom, are usually used for generating the braking torque. If, for instance, the carrier vehicle rotates about the pivot axis due to bumps, and the spray boom stands still, this will also result in a relative rotation between the carrier vehicle and the spray boom. A mechanical dampener arranged between the carrier vehicle and spray boom would counteract this relative rotation and thus transmit a torque acting about the pivot axis to the spray boom, such that a coupling exists between carrier vehicle and spray boom.

The coupling likewise exists if a measuring system is used as a basis for regulating the torque, which measuring system measures a relative angle and/or a relative rotation between carrier vehicle and spray boom.

In addition, measuring systems are known, which use tilt sensors arranged at the spray boom for determining the position of the spray boom. The angular velocity of the spray boom can be acquired independently of the carrier vehicle from the temporal derivation of the tilt. In the instance of lateral accelerations such as occur, for example, when driving along curves, tilt sensors however provide an incorrect tilt. An incorrect angular velocity will therefore also be calculated.

A spray boom which has a cantilever that is put together of segments is already known from the prior art. DE 32 02 569 A1 discloses a distribution machine, in which individual segments are connected with each other and the movement of the individual segments is affected passively. For this mechanism, a supporting element is necessary on the outer end of each of the cantilevers in order to enable the pivoting process. In order to prevent loss of harvest, it is however desirable to achieve an adjustment of the individual segments with regard to different ground contours without being in direct contact with the ground.

DE 18 33 453 U furthermore discloses a spray boom comprising nozzle trees, which are arranged on a cantilever by means of elastic elements. By the elastic elements, the nozzle trees can recover a vertical position even after a pivoting process of the cantilever. According to that document, the cantilever is arranged to be pivotable about only one axis, so that the spray boom possesses only limited flexibility. Due to the high degree of irregularity of ground structures occurring in practice, spray booms with a greater flexibility are desirable in order to ensure an even distribution of the spray liquid on the soil.

A spreading device for spreading liquid and/or solid active agents is known from DE 10 2007 025 751 A1. The spread device comprises a spreading boom arranged on a self-propelled or towed vehicle, which spreading boom is mounted to be pivotable about a suspension axis approximately parallel to a driving direction. The spread boom consists of a middle part and lateral cantilevered arms. The middle part is coupled with a frame section of the vehicle via at least one controllable actuating apparatus. The actuating apparatus induces a defined actuating power and/or a defined actuating torque between the middle part and the frame section for the purpose of pivoting the spreading boom relative to the frame section. Inducement of the actuating power occurs independently of disturbance torques resulting from vehicle movements.

An automated spreading device, also termed as accompanying spreading device, for spreading liquid and/or solid active agents is known from FR 2 779 031 A1. The spreading device comprises a spreading boom arranged at a self-propelled or towed vehicle, which spreading boom is mounted to be pivotable about a suspension axis approximately parallel to a driving direction. The spreading boom consists of a middle part and lateral cantilevered arms. The middle part is coupled with a frame section of the vehicle via at least one controllable actuating apparatus. Via at least two points of application, the actuating apparatus actuates at least two powered actuators between the middle part and the frame section for the purpose of pivoting the spreading boom within a vertical plane relative to the frame section. Actuation of the actuators overcomes the rotational inertia of the spreading boom while simultaneously reducing disturbances or movements of its center of gravity. In the process, the center of gravity is shifted transversely to the driving direction within the vertical plane. A controller causes the spreading boom to pivot upwards to desired position or set point. The actuating apparatus can be designed, for example, as a screw spindle or as a hydraulic actuator.

A spreading device for spreading liquid and/or solid active agents is known from FR 2 270 774 A1. The spread device comprises a spreading boom arranged on a self-propelled or towed vehicle, which spreading boom is mounted to be approximately in parallel to a driving direction. The spread boom, consisting of a middle part and lateral cantilevered arms, is connected with a vertical cylinder by means of two pins, with the cylinder being arranged at a suspension point of a frame section to be pivotable about an axis in parallel to the driving direction. The opposite end of the vertical cylinder is guided between two horizontal cylinders supporting themselves against the frame section. The vertical cylinder and thus the spread boom can be aligned in parallel to the ground by actuating the horizontal cylinder. The spread device provides two operating modes. One operating mode provides aligning the spread boom by a height adjustment of the vertical cylinder and by lateral tilting of the vertical cylinder by means of the horizontal cylinder. Another operating mode provides removing the lower pin in rough terrain such that the spread boom can swing freely.

An ultra-sonic sensor controlled height control and position control for a spreading device for spreading liquid and/or solid active agents is known from DE 41 40 254 A1.

The prevention of harmonic couplings in a spreading device for spreading liquid and/or solid active agents is known from WO 2004/041446 A1, in which natural resonant frequencies of the cantilevered arms of a spreading boom, both in an empty state and in a full state of the lines and also during spraying operation, the resonance frequency of a rotary oscillation of the swingingly suspended spreading boom, the resonance frequency of a spring suspension of the vehicle to which the spreading device is fastened, the resonance frequency of active agent sloshing in the tank provided for this as well as the resonance frequency of an active agent pump are independent of each other. For this purpose, the length of the cantilevered arms can be adjustable.

Spreading devices for spreading liquid and/or solid active agents are known from EP 0 157 592 A2. A first spreading device provides a freely swinging suspension of a spreading boom with occasional correction processes taking place, in which the height of the spreading boom above the ground is readjusted according to a specified spacing between the cantilevered arms and the ground. A second spreading device provides a fixed alignment of the spreading boom before, after, and during consecutive correction processes, in which the height of the spreading boom above the ground is readjusted according to a specified spacing between the cantilevered arms and the ground. A third spreading device provides the spreading boom to be suspended passively and the passive suspension to be changeable at least with respect to one suspension property in order to effect a continuous change of alignment of the spreading boom. In this context, the continuous change is carried out slower than the self-stabilizing of the passive suspension.

SUMMARY

The task of the invention is to develop a device, such as, for instance, a field sprayer, for spreading liquid and/or solid active agents with a carrier vehicle and at least one boom with cantilevers projecting on both sides of the carrier vehicle, which boom is arranged pivotably about at least one pivot axis running preferably in parallel to a longitudinal axis of the carrier vehicle, which device enables maintaining as precisely as possible the spacing of the cantilevers in relation to the ground surface, also in the instance of uneven ground and a moving or rolling carrier vehicle, as well as specifying a method for controlling such a device, by means of which method it is made possible to maintain as precisely as possible the spacing of the cantilevers in relation to the ground surface, also in the instance of uneven grounds and a moving or rolling carrier vehicle.

The task is respectively solved by the features of the independent claims.

Features of advantageous further developments of the invention are indicated in the dependent claims, in the following section with the general description, in the figures as well as in the corresponding section with the description of the figures.

A first object of the invention thus relates to a device for spreading liquid and/or solid active agents. The device comprises:
  a carrier vehicle,
  at least one boom arranged pivotably about at least one pivot axis,
  at least one sensor arrangement for detecting an angular velocity and/or an angular position of the boom about the pivot axis in relation to a reference plane,
  a regulation apparatus processing output signals of the sensor arrangements to control signals,
  at least one actuator influencing the present angular position of the boom about the pivot axis based on control signals from the regulation apparatus,
  which at least one actuator is formed by at least one linear or rotary actuator operating electromotively and/or electromagnetically, which actuator provides an actuating connection between the carrier vehicle and the pivotable boom, wherein the at least one linear or rotary actuator has respectively one active pressure side for each of the two shifting directions of the boom, which active pressure side is actuatable electromagnetically or with an electromotive driving force, wherein an approximately equal level of force prevails in the active drive sides of two linear or rotary actuators operating in opposition or in the active drive sides of a double-acting linear or rotary actuator, respectively, when the boom is stationary or moves only slightly in relation to the carrier vehicle, and wherein a defined differential force is settable between the active drive sides of the two linear or rotary actuators operating in opposition or between the active drive sides of a double-acting linear or rotary actuator, respectively, when the boom is shifted in relation to the carrier vehicle.

It is provided for the invention that the device with the pivotable boom and the sensor arrangement, which device comprises a carrier vehicle, has an electromotively driven actuator or drive, respectively, or a plurality of electromotively driven actuators or drives, which respectively produces/produce an actuating connection between the carrier vehicle and the pivotable boom, wherein the at least one electrical or electromotively driven linear actuator or rotary actuator has respectively one electromotively operable active actuating side for each of the two shifting directions of the boom. Instead of the known actuating elements, which operate with pneumatic cylinders or hydraulic cylinders, the present invention provides actuating elements, which can be formed by electromagnetic drives, for instance, or by linear electromagnets or also by other electromotive drives. Besides the relatively high power density and the realizable high actuating speeds, these drive variants have the advantage that the required actuating power or the induced torque, respectively, can be set particularly precisely via the current applied to the electromotive or electromagnetic drives. A suitable control unit can provide for the induced force or the induced torque, respectively, to be regulatable very precisely.

In the device according to the invention, a connection is preferably produced between the measured rotation angles or the angular position, respectively, of the boom and the angular velocity by the temporal integration of a measured value of the angular rate referred to as angular velocity, from which the rotation angle representing the angular position of the boom in relation to the reference plane can be determined. Disturbances caused by movements of the carrier vehicle or by translational accelerations of any kind have no influence on the calculation in this context, whereas measuring errors are likewise integrated and cause an angle drift of the rotation angle. Although a measurement of the angular position in relation to the reference plane, for instance by a measurement of the relative rotation between carrier vehicle and boom or a measurement of a tilt angle relative to the acceleration of gravity has the disadvantage of the influence from disturbances caused by rotary movements of the carrier vehicle or by translational accelerations such as occur when driving along curves, for example, but this is offset by the advantage that this type of detection of the angular position is not subject to any angle drift.

These measured values are most reasonably acquired in the device according to the invention by at least one sensor arrangement for detecting the angular velocity and/or the angular position of the boom about the pivot axis in relation to the reference plane being formed by at least one angular rate sensor, rotational angular velocity sensor, and/or angular acceleration sensor arranged on the boom. Optionally, the sensor arrangement can also be arranged on the carrier vehicle. It is also feasible to use two such sensor arrangements, one on the boom and one on the carrier vehicle.

The device according to the invention can provide that the spray boom is pivotally mounted on an abutment part about an axis with an angular rate sensor (gyroscope) being mounted directly on and/or at the spray boom and/or at the carrier vehicle. The present position and the present movements of the boom in relation to a reference plane ("artificial horizon"), which are independent of the carrier vehicle, are determined by means of the gyroscope or by means of the mentioned sensor arrangement, respectively. In this way, it can be achieved that rotary movements or rolling movements of the carrier vehicle (self-propelled or towed field sprayer) do not immediately have a direct influence on the boom because the measured values determined by the gyroscope refer to the rotary movements of the boom in relation to the surface of the earth. In this manner, the sensor arrangement acquires absolute position values, which are particularly suited for detecting and either compensating for or damping undesired swing motions and/or deflection motions of the boom.

The at least one actuator can be formed, for instance, by at least one double-acting, electromotively operating linear actuator, or also with a double-acting, electromagnetically operated linear actuator, which produces an actuating connection between the carrier vehicle and the pivotable boom. In this instance, an actuating drive of the linear actuator, which actuating drive is coupled with the boom and is movable between two end positions, separates two actuating sides from each other, which actuating sides are respectively actuatable with electromotive or electromagnetic actuating power for each of the two shifting directions of the boom. When the boom is stationary or moves only slightly in relation to the carrier vehicle, an approximately equal level of force is applied to these two actuating sides, as can be preferably detected by means of suitable sensors and evaluated in the regulating circuit together with the measured values of the sensor arrangement or of the angular rate sensor or gyroscope, respectively. If the boom is intended to move in relation to the carrier vehicle, however, the double-acting actuating drive is actuated with actuating power such that a defined differential force is settable between the two actuating sides of the double-acting linear actuator when the boom is shifted or is to be shifted in relation to the carrier vehicle. In such electromotive or electromagnetic drives, the prevailing actuating powers or the actuating powers to be applied can advantageously be detected by means of an evaluation of the current flows required for the drives. Since the current consumption respectively changes with the counterforces prevailing in the system, very precise inferences regarding the respective actuating powers can be acquired from the evaluation of the current flow.

In the instance of swinging suspensions, the proposed spray boom regulation can thus be carried out with, for instance, at least one electromotive or electromagnetic actuating drive, with which the spray boom can be respectively adjusted in relation to the pendulum swing. On the one hand, the actuating drive is connected to the spray boom and on the other hand to the abutment part. The abutment part can also be part of a vehicle, for instance a frame part of a plant protection sprayer.

An alternative embodiment of the device according to the invention can provide that the actuator is formed by at least two linear actuators operating in opposition and each operating with electromotive or electromagnetic driving force, which linear actuators produce an actuating connection between the carrier vehicle and the pivotable boom, with each of the two linear actuators having respectively one actuating side, and with respectively one of the two linear actuators being actuatable with electromotive or electromagnetic driving force for a specified shifting direction of the boom. In this embodiment, too, an approximately equal force level prevails at the two actuating sides of the linear actuators when the boom is stationary or moves only slightly in relation to the carrier vehicle. In contrast, if the boom is shifted or is to be shifted in relation to the carrier vehicle, a defined differential force is settable between the two actuating sides of the two linear actuators.

The mentioned drives, i.e. the at least one double-acting actuating drive or the at least two single-acting actuating drives, for instance, are operated electromotively or also electromagnetically. It should be noted here that the same principles can be applied to rotary actuators (one-sided or double-acting) such that the mentioned variants can be read and should thus be understood to apply in a corresponding manner to electromotive or electromagnetic rotary actuators.

An alternative embodiment of the device according to the invention thus provides that the at least one actuator is formed by at least one double-acting, electromotively or electromagnetically operating linear actuator, which produces an actuating connection between the carrier vehicle and the pivotable boom, where a section of the linear actuator, which is coupled with a boom and is movable between two end positions, has two actuating sides, which are respectively actuatable with electromotive or electromagnetic actuating power for each of the two shifting directions of the boom. In this instance, an approximately equal level of force is applied at the two actuating sides when the boom is stationary or moves only slightly in relation to the carrier vehicle. Likewise, if the boom is shifted in relation to the carrier vehicle, a defined differential force is settable between the two actuating sides of the double-acting actuating drive.

In addition, the device can be equipped such that the actuator is formed by at least two linear actuators operating in opposite directions and operating electromotively or electromagnetically, respectively, which linear actuators produce an actuating connection between the carrier vehicle and the pivotable boom, with each of the two linear actuators having respectively one actuating side or drive side, and with respectively one of the two linear actuators being actuatable with an electromotively or electromagnetically generated driving force for a specified shifting direction of the boom. An approximately equal level of force is applied at both actuating sides of the two linear actuators when the boom is stationary or moves only slightly in relation to the carrier vehicle. When the boom is shifted in relation to the carrier vehicle, a defined differential force is settable between the two actuating sides or drive sides of the two linear actuators.

If electromotive or electromagnetic drives for actuators are referred to in this context, they may generally comprise electric motors, which act on and movably control the spray boom via lever mechanisms. For these variants, it can also be provided that the required actuating power or the induced torque, respectively, can be set particularly precisely via the current applied to the electromotive drives. A suitable control unit can provide for the induced force or the induced torque, respectively, to be regulatable very precisely.

The following aspects can be particularly pointed out as differences of the device for spreading liquid and/or solid active agents according to the invention in comparison to known spray devices:

The invention provides a spray boom, which is suspended at a support frame rotatably or swingingly about a pivot axis extending approximately parallel to the vehicle axis. Preferably at least one electromotive actuating element (possibly also electromagnetic) is arranged between the spray boom and the support frame. The forces or the currents required for the electromotive or electromagnetic drives, which forces or currents are applied at the actuating elements, are detected or regulated. As an alternative, strain gauges can be used on the piston rods or at connection points or the like.

During instances when no shifting of the boom is necessary, the resulting differential force is regulated to approximately zero, so that no or no noteworthy force is applied to the boom. If it is necessary, however, to shift the boom about its pivot axis due to the driving situation of the device, for instance, in uneven terrain or at a slope, it is regulated to a defined differential force. The detection of the angular velocity can be carried out, in particular, via the gyroscope. The pivot angle can be calculated by integration of the angular velocity.

Furthermore, slight rotary movements or rolling movements, respectively, are not immediately actively readjusted, and the damping of the boom can in this context be effected by appropriate elasticities in the at least one actuating drive. Optionally, the connection between cylinder and boom can also be carried out by means of an elastomer or by way of a slot with a corresponding spring or damping element.

As an alternative to two actuating drives, a double-acting cylinder or drive, for instance an electromotively operating drive, can be employed.

Alternatively to measuring the differential force, it is also feasible to provide the at least one drive with a position sensor system so that movements of the boom can be determined not via a differential force, but rather via a length change of the actuating element. Upon the length change exceeding a defined value, the boom can be actively readjusted or the boom is regulated, respectively, to a certain length of the actuating element on the basis of the values specified by the gyroscope.

A further alternative to measuring the differential force would be the use of at least one strain gauge, which is mounted, for instance, on the piston rod of the at least one actuating element. If there is no movement of the spray boom or if no active regulation is required, the strain gauge determines no or only a small traction force and/or compressive force, respectively. On exceeding a defined traction force or compressive force, the boom can be actively readjusted or the boom is regulated, respectively, to a certain traction force and/or compressive force on the basis of the values specified by the gyroscope.

In addition to the above described device for spreading solid and/or liquid active agents, the present invention furthermore proposes a method in order to solve the above task. This method according to the invention serves, in particular, for controlling a device according to one of the previously described embodiments and provides for regulation of the angular position of a boom pivotally mounted about a pivot axis on a carrier vehicle, namely for regulation dependent on a measured angular position and/or a measured differential force on at least two actuating sides of an electromotively or electromagnetically operated actuator,
   wherein a differential force is minimal and the actuator builds no or only a minimal actuating power between carrier vehicle and boom when the boom is stationary or moves only slightly out of its rest position,
   and wherein a definable differential force builds up between the two actuating sides when the boom is to be shifted, wherein a present angular velocity and/or angular position of the boom about the rotation axis in relation to a reference plane is determined by means of at least one sensor arrangement, which comprises an angular rate sensor, a rotational angular velocity sensor, and/or an angular acceleration sensor arranged on the boom or on the carrier vehicle.

In one variant of the method, both the measurement data of the at least one sensor arrangement and the differential forces between the two actuating sides of the at least one actuator are used for determining a present angular position and/or a target angular position between boom and carrier vehicle and are processed by a regulation apparatus, which controls the at least one actuator based on these measurement data, which actuator changes the boom position in the desired manner such that the boom, in particular, retains or assumes, respectively, its horizontal position when the ground is even or its position parallel to an inclined ground surface, respectively.

Additionally, it should be noted here that the distribution device according to the invention can preferably be an agricultural distribution machine, in particular a field sprayer for spreading liquid plant protection products and/or fertilizers, and also solid active agents, as the case may be, which can be spread, for instance, in a an atomized form. The field sprayer can be designed, for instance, as a self-propelled machine or as a machine connected to a towing vehicle or hitched onto it, respectively. Normally, the field sprayer essentially consists of a frame for carrying the individual assemblies, a storage vessel for carrying along the spray liquid to be spread, a computer unit for controlling the individual machine elements as well as a distribution device or spray boom, respectively, extending transversely to the driving direction, which distribution device or spray boom is height adjustable in relation to the frame by means of actuating elements and rotatable or pivotable about a horizontal longitudinal axis. A plurality of so-called nozzle holders are arranged evenly spaced apart on the distribution device. Mounted on these nozzle holders, in turn, is at least one spray nozzle, respectively, however, a plurality of spray nozzles for distributing the plant protection liquid and/or the fertilizing liquid will generally be mounted thereon. For this purpose, the spray nozzles produce a spray cone, which is directed toward the plant growth. The control of the actuating elements for the height adjustment as well as for controlling the desired nozzle holders or spray nozzles, respectively, is carried out, for instance, by way of spreading patterns or spreading profiles, respectively, which are stored in a computer system.

Preferably, a suitable angular rate sensor or also a plurality of angular rate sensors, which is/are mounted directly on the boom, can be used for detecting the angular velocity in the device according to the invention. Rotary movements of the carrier vehicle thus have no influence on determining the angular velocity of the boom. An output signal of an angular rate sensor, which output signal is proportional to the measurand or reflects it, thus corresponds to the rotary movement of the boom in relation to any optional reference plane, for instance in relation to the surface of the earth or to a long-term orientation of the carrier vehicle reflecting an averaged ground profile.

This measurand or an output signal of an angular rate sensor detecting the angular velocities of the boom, which output signal is integrated into the control signals to the actuator or actuators and serves as an input variable for the regulation apparatus, and which output signal is proportional to this measurand or reflects it, can be used for the purpose of attaining an active damping of the boom in the form of an actively induced brake torque.

Alternatively or additionally, the at least one sensor arrangement for detecting an angular velocity of the boom about the rotation axis in relation to a reference plane can comprise at least one angular rate sensor arranged at the carrier vehicle for the purpose of measuring angular velocities of the carrier vehicle at least about its longitudinal axis and thus measuring rotary movements representing disturbances in the movement of the carrier vehicle. This means that an additional angular rate sensor can optionally also be employed at the carrier vehicle, thus enabling a comparison of the measured values for an even better position determination and/or angle determination of the boom.

Additionally, the at least one sensor arrangement for detecting an angular velocity of the boom about the rotation axis in relation to a reference plane can in this instance comprise at least one angle of rotation sensor or rotational angular velocity sensor detecting the relative rotation between carrier vehicle and boom such that the absolute angular velocity of the boom about the rotation axis can then be determined from the two measured values of the angular velocity of the carrier vehicle in relation to its longitudinal axis and relative rotation between carrier vehicle and boom.

Alternatively or in addition to an angular rate sensor the at least one sensor arrangement for detecting an angular velocity of the boom about the rotation axis in relation to a reference plane can comprise an angular acceleration sensor. A value for the angular velocity can be obtained by temporal integration of the angular rate sensor output signal.

The means for determining an angular velocity of the boom about the rotation axis in relation to a reference plane can comprise one or a plurality of inertial sensors arranged at the boom.

Inertial sensors serve for measuring accelerations and angular rates. By combining a plurality of inertial sensors in an inertial measurement unit, also termed IMU, accelerations of a rigid body can be measured in up to six degrees of freedom (three translational and three rotational degrees of freedom). An IMU is the main component of an inertial navigation system, also termed IMS.

Examples of inertial sensors are acceleration sensors and angular rate sensors.

An angular rate sensor detects the rotational speed or angular velocity, respectively, of a body about a specified rotation axis or pivoting axis, with an output signal of an angular rate sensor being preferably uniquely proportional to a detected angular velocity.

By integration of the angular velocity over a time interval, it is possible to derive the angle by which the body has rotated in that time interval. The angular rates about the three spatial axes are termed as:

yaw rate (rotation about the vertical axis),
pitch rate (rotation about the lateral axis), and
roll rate (rotation about the longitudinal axis).

The measuring principle is essentially based on two measuring principles, on the one hand on the Coriolis force, which acts on a mechanically moving system, and on the other hand the Sagnac effect, which can be observed with light.

Examples of mechanical, moving systems using the Coriolis force are:

Foucault pendulum;
gyrocompass;
dynamically tuned gyroscope (DTG), having a measurement error <1°/h;

vibrating structure gyroscope, having a measurement error <10°/h; and
halteres.

Examples of optical systems using the Sagnac effect are:
ring laser gyroscope (RLG), having a measurement error <0.001°/h;
fiber optic gyroscope (FOG), having a measurement error <1°/h.

As a general rule, inertial measurement units contain the following sensor types:
Three orthogonally arranged acceleration sensors (also termed translational sensors) which detect the linear acceleration in the x or y or z axis, respectively, and from which, the translational movement can be calculated by double integration.
Three orthogonally arranged angular rate sensors (also termed gyroscopic sensors) which measure the angular velocity about the x or y or z axis, respectively and from this, the rotational motion can be calculated by single integration.

Magnetic field sensors, for example, such as compass sensors, can be additionally provided for determining the constant of integration and/or for improving the accuracy and/or for correcting a drift of the sensors, and/or for receiving signals from an existing and/or future global navigation satellite system, also abbreviated as GNSS, such as:
GPS (Global Positioning System) of the United States of America, and/or
GLONASS (GLObal NAvigation Satellite System) of the Russian Federation, and/or
Galileo of the European Union, and/or
BeiDou of the People's Republic of China.

The at least one sensor arrangement for detecting an angular position of the boom about the rotation axis in relation to the reference plane can comprise at least one sensor detecting a relative rotation between carrier vehicle and boom in relation to the rotation axis.

At least one sensor for detecting a relative rotation between carrier vehicle and boom can be an angle of rotation sensor arranged between the boom and the carrier vehicle.

Alternatively or additionally, a detection of a relative rotation between carrier vehicle and boom can be realized by means of at least one tilt sensor detecting an angle between the carrier vehicle and the reference plane and by means of at least one tilt sensor detecting an angle between the boom and the reference plane, where the difference of the angle between the carrier vehicle and the reference plane and the angle between the boom and the reference plane, as are detected by the sensors, is proportional to a relative rotation between carrier vehicle and boom.

The invention allows a very accurate determination of a present angular orientation of the boom in relation to a reference plane. In comparison to determining the angular position by means of a plurality of ultrasonic sensors, the invention is less elaborate and less cost-intensive.

In addition, the device can comprise an actuator operable to adjust an average spacing of the boom in relation to the ground or to the growth based on control signals from the control unit, for instance in the form of one or a plurality of hydraulic cylinders, which actuator converts control signals into mechanical motion or another physical quantity, such as, for instance, pressure, and thus exerts a force on the boom, which force raises or lowers the boom. Electromotive drives can optionally be used instead of hydraulic cylinders for raising and lowering the boom.

Furthermore, the device can comprise at least one sensor arrangement for detecting at least one average spacing of the boom in relation to the ground or to the growth. Preferably, such a sensor arrangement comprises at least one distance sensor arranged at one end of a cantilever of the boom. By means of this distance sensor and an appropriate consideration of its output signals in producing control signals by means of the control unit, it is possible to increase the reliability with which the boom or spreading means for solid and/or liquid active agents arranged thereat, such as, for instance, spray nozzles, are prevented from coming into contact with the ground and/or with the growth.

Alternatively or additionally, such a sensor arrangement can comprise at least one distance sensor arranged at the part of the boom not projecting beyond the width of the carrier vehicle.

By means of the distance signals of the sensors, the control unit can produce control signals provided at least for the actuator influencing at least one average spacing of the boom in relation to the ground or to the growth.

In order to exclude influences by uneven mass distributions of the boom as far as possible, the rotation axis preferably runs through the center of gravity of the boom.

The at least one boom can be arranged at or mounted on the carrier vehicle in a non-permanent manner or so as to be exchangeable for another apparatus for agricultural soil treatment and/or growth treatment.

In this context, the carrier vehicle can be driven or towed such that the device:
forms a self-propelled agricultural unit, in the nature of a driven carrier vehicle with a permanently mounted boom;
forms a towed agricultural unit, such as, for instance, an agricultural trailer, in the nature of a towed carrier vehicle with permanently mounted boom; and
forms either an attachment unit or a mounting unit in the nature of a driven carrier vehicle with a boom that is arranged so as to be exchangeable for another apparatus for agricultural soil treatment and/or growth treatment, for instance on a three-point hitch or on a loading platform provided for this purpose.

Additional advantages in comparison with prior art over and above those already mentioned will result from completely solving the proposed task together with the remedy of any disadvantages of prior art.

Moreover, by precisely maintaining the spacing of the cantilevers in relation to the ground surface and/or to the growth, independent of the moving and/or rolling of the carrier vehicle the cantilevers are reliably prevented from coming into contact with the ground.

All of the measurement data provided by the acceleration sensors and/or by the gyroscopes or other such measurement arrangements are preferably checked against the measured values for pressure, force, and/or strain from the at least one actuating element, which is arranged between the boom and the carrier vehicle, and which preferably provides no differential pressure or no or only low force values, respectively, in the instance of a stationary boom.

BRIEF DESCRIPTION OF THE DRAWINGS

In the following passages, the attached figures further illustrate exemplary embodiments of the invention and their advantages. The size ratios of the individual elements in the figures do not necessarily reflect the real size ratios. It is to be understood that in some instances various aspects of the invention may be shown exaggerated or enlarged in relation to other elements to facilitate an understanding of the invention.

DETAILED DESCRIPTION

The same or equivalent elements of the invention are designated by identical reference characters. Furthermore and for the sake of clarity, only the reference characters relevant for describing the respective figure are provided. It should be understood that the detailed description and specific examples of the device and method according to the invention, while indicating preferred embodiments, are intended for purposes of illustration only and are not intended to limit the scope of the invention.

Figure 1:
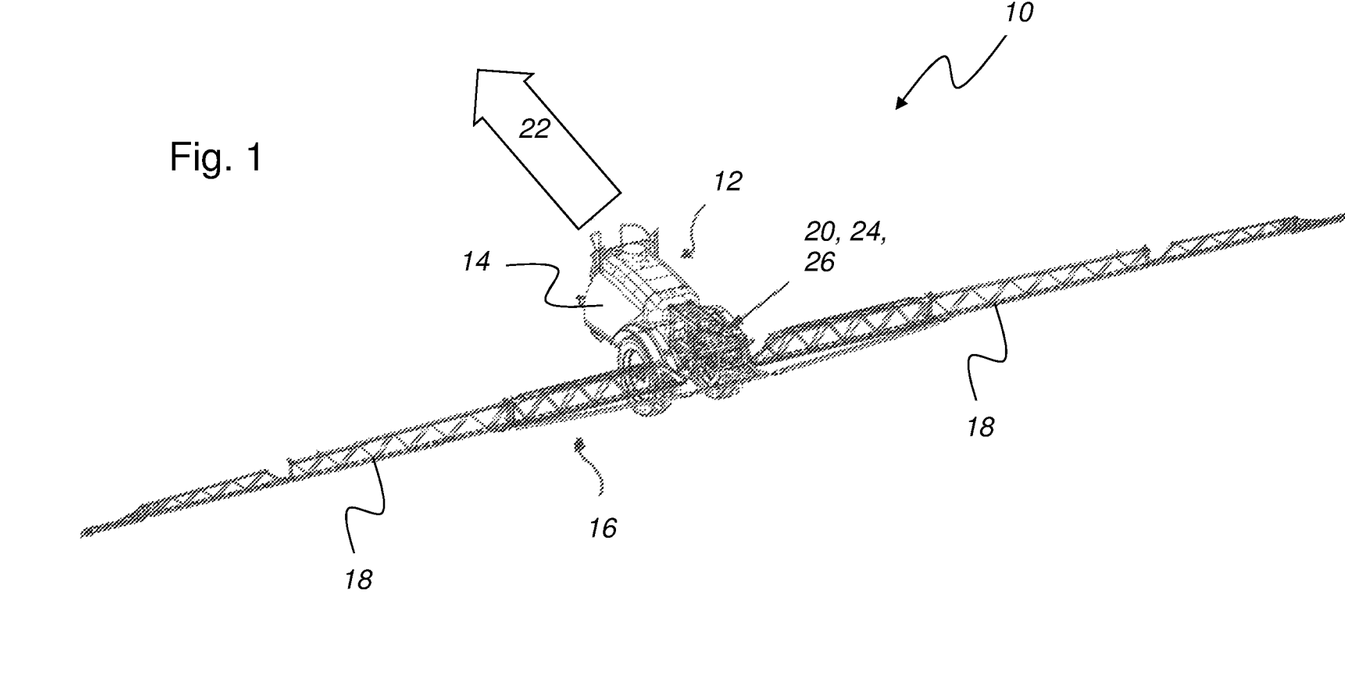
FIG. 1 is a schematic perspective view of an embodiment of an agricultural distribution device formed by an agricultural carrier vehicle, which is equipped with a spray boom.

The schematic perspective view in FIG. 1 shows an embodiment of an agricultural distribution device 10 formed by a towed agricultural carrier vehicle 12 with a tank 14 for a spreading liquid and with a spray boom 16 suspended at the rear-end, which spray boom 16 has two symmetrically designed cantilevered arms 18, which are equipped with nozzle holders, which are not discernible in the drawing, and with spray nozzles integrated therein for atomizing the spreading liquid, for instance, the spraying agent. The suspension 20 for the spray boom 16 at the frame on the one hand enables twisting or rotation the boom 16 about a horizontal longitudinal axis, which is oriented in parallel to the driving direction 22 of the vehicle 12, and on the other hand allows horizontal alignment of the boom 16 or alignment in parallel to the ground surface, respectively, when the suspension 20 twists or rotates or moves in any manner, in particular due to bumps, uneven terrain, etc.

Figure 2:
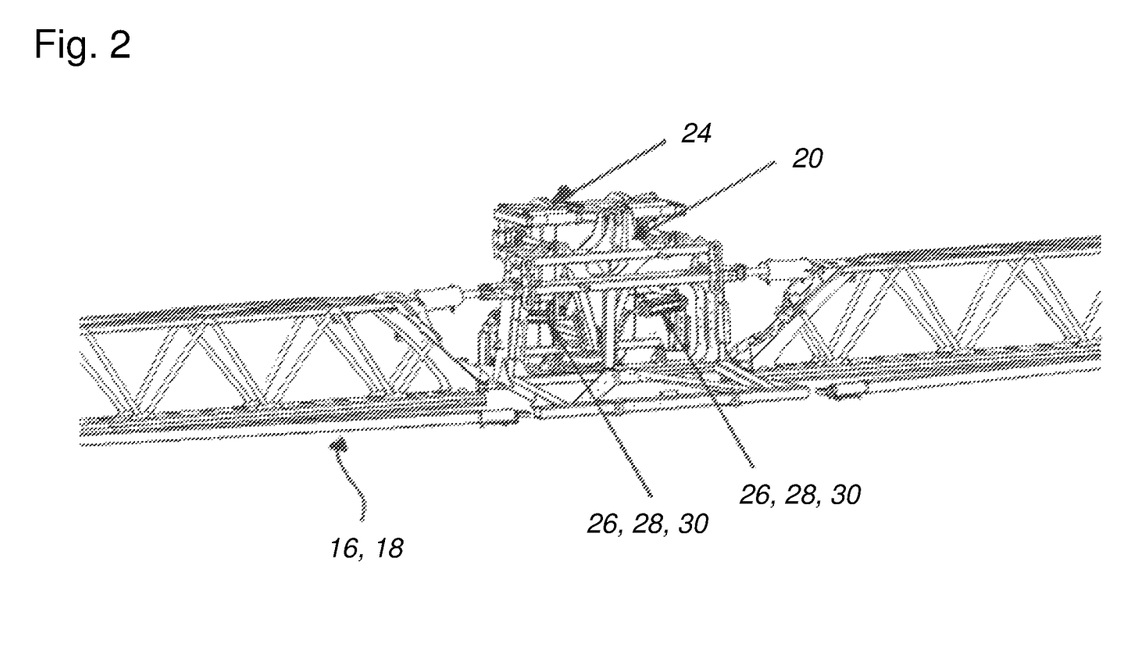
FIG. 2 is a detailed view of a suspension of the boom at the carrier vehicle.
Figure 3:
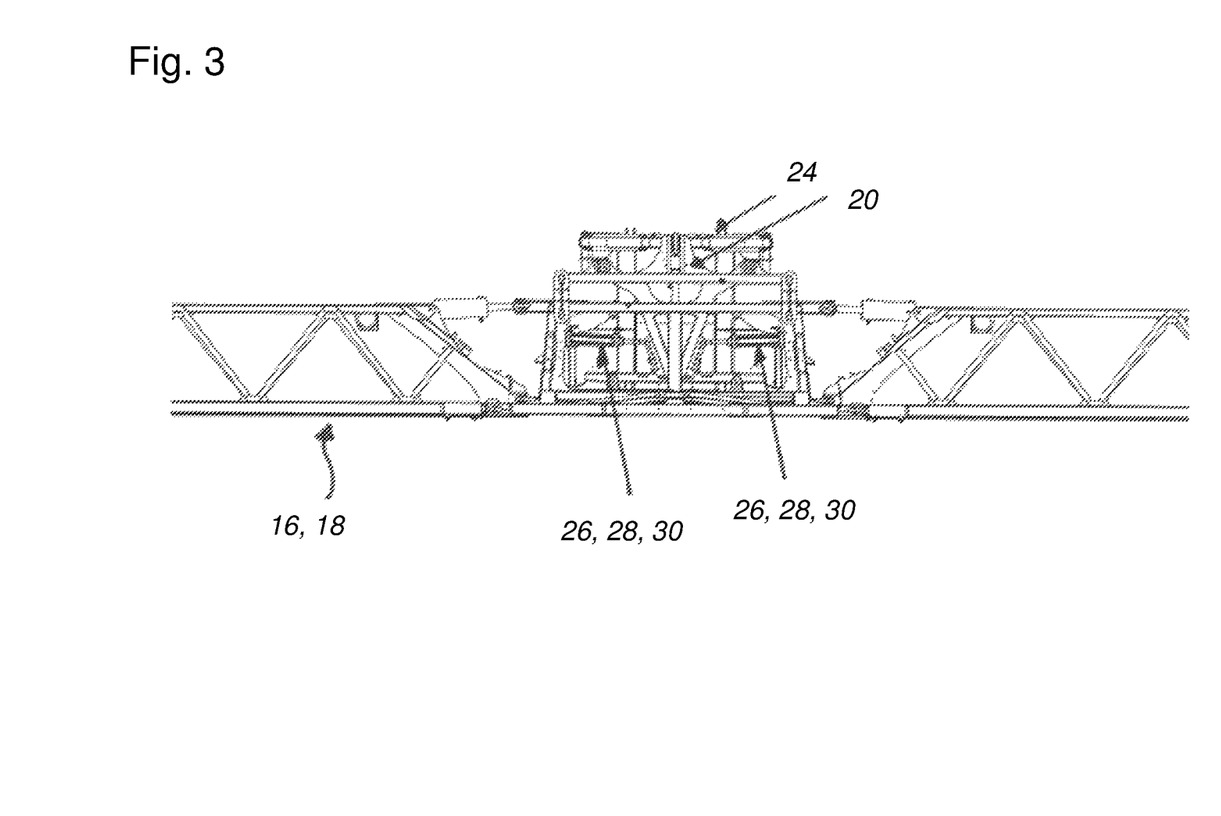
FIG. 3 is a further detailed view of a suspension of the boom at the carrier vehicle.

As the detailed views of FIG. 2 and FIG. 3 show, the boom 16, which is swingingly or rotatably suspended, about the rotation axis (in parallel to the driving direction 22) at the suspension 20 of the carrier frame 24 of the carrier vehicle 12, is coupled with the carrier frame 24 by pneumatic or hydraulic, electromotively or electromagnetically actuated actuating elements 26. In the exemplary embodiment shown here, the actuating elements 26 are formed by two separate linear motors 28 operating in opposition and actuated electromotively or electromagnetically, which linear motors 28 are each associated with pressure sensors 30 and/or position sensors. In the two actuating drives of the linear actuators 28, the pressures or forces can be detected by means of suitable pressure sensors or force sensors 30, respectively (for instance a differential pressure sensor or two pressure sensors, force sensors, etc); as the case may be, the difference in the stroke or length of the extending and shortening actuating element 26 can also be detected by means of the position sensors or also by means of strain gauges on the piston rods or at their connections to the boom 16 and/or at the suspension 20. It is particularly reasonable in using electromotive or electromagnetic linear actuators 28 according to the invention to measure or regulate the electrical currents required for activating the linear actuators 28, from which the resulting actuating powers can be immediately derived.

Figure 4:
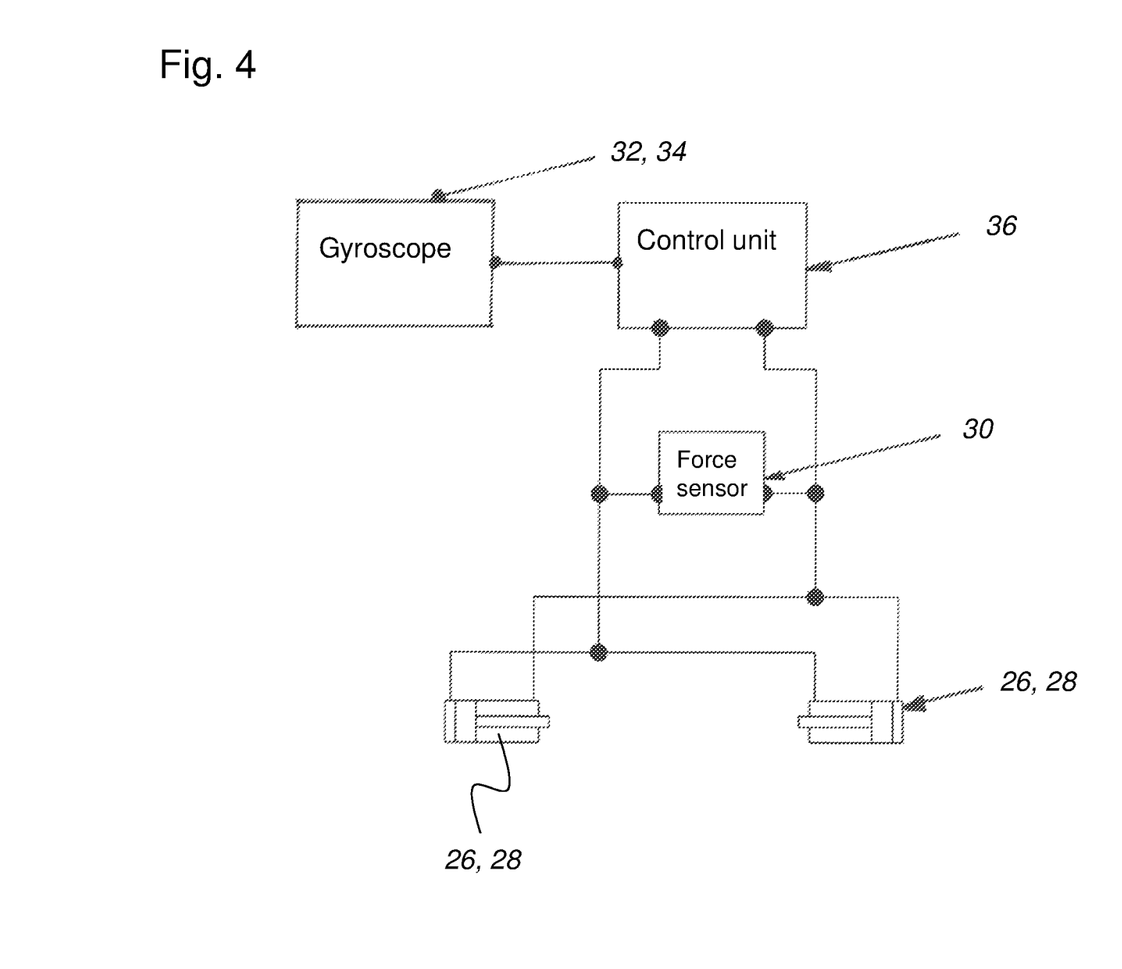
FIG. 4 is a schematic block diagram showing components for shifting the boom hinged at the carrier vehicle.

The schematic block diagram of FIG. 4 illustrates the switching components for deflection of the boom 16 hinged at the carrier vehicle 12 to one side or the other to hold the boom 16 in a horizontal position with the carrier vehicle 12 moving while driving, for example, over uneven terrain.

For each of the two actuating drives of the linear actuators 28, the pressures or forces are detected, in particular by way of detecting the currents to be applied for shifting or rotating the boom 16. If no shifting or rotation of the boom 16 is necessary, the differential force is regulated to a minimum value or to zero such that no actuating power is induced into the boom 16. If, however, a shifting or rotation of the spray boom 16 relative to the suspension 20 about a rotation axis is required, a defined differential force is set or such a value is regulated, respectively.

Movement of the spray boom 16, in particular its angular velocity (absolute value) is detected via the sensor arrangement 32, in particular via a gyroscope 34, which transmits the measured values to the control unit 36. By integration of the detected angular velocity, the angle of twist or pivoting that is necessary to readjust the orientation of the spray boom 16 by the angulation of the actuating element 26 or the actuating elements 26 can be calculated. Furthermore, it can preferably be provided that slight rotational or rolling movements, are not immediately actively readjusted, wherein the damping of the boom 16 can, in this context, be effected by elasticities in the actuating elements 26. The control unit or regulating unit 36, analyzes the measured values provided by the force sensors 30—for instance, a differential force sensor—and correspondingly controls the actuating cylinders 28.

In the exemplary embodiment shown here, two linear motors 28 operating in opposite directions are provided as actuating elements 26, with one linear motor 28 being provided for each direction of rotation. As an alternative actuating arrangement, a double-acting linear motor acting in both work directions (back and forth) can also be employed.

An alternative to measuring the differential force would be the use of at least one strain gauge, which can be mounted, for instance, onto the piston rod of the at least one actuating element 26. If there is no movement of the spray boom 16 or if no active regulation is required, the strain gauge determines no or only a small traction force and/or compressive force. On exceeding a defined traction force or compressive force, the boom 16 can be actively readjusted or the boom 16 is regulated to a certain traction force and/or compressive force on the basis of the values specified by the gyroscope.

The invention has been described with reference to a preferred embodiment. Those skilled in the art will appreciate that numerous changes and modifications can be made to the preferred embodiments of the invention and that such changes and modifications can be made without departing from the spirit of the invention. It is, therefore, intended that the appended claims cover all such equivalent variations as fall within the true spirit and scope of the invention.

LIST OF REFERENCE CHARACTERS

10 Distribution device
12 Carrier vehicle
14 Tank
16 Boom, spray boom
18 Cantilevered arms
20 Suspension
22 Driving direction 24 Carrier frame
26 Actuating element
28 Linear motor
30 Pressure sensor, force sensor
32 Sensor arrangement
34 Gyroscope
36 Control unit, regulating unit

The invention claimed is:

1. A device for spreading liquid and/or solid active agents, comprising:
a carrier vehicle,
at least one boom arranged pivotably about at least one rotation axis,
at least one sensor arrangement for detecting an angular velocity and/or an angular position of the boom about the rotation axis in relation to a reference plane and for generating output signals corresponding to the detected angular velocity and/or angular position,
a control unit operable to process output signals of the sensor arrangement and to generate control signals,
two linear or rotary actuators operating in opposite directions or a double-acting linear or rotary actuator, wherein the two linear or rotary actuators operating in opposite directions or the double-acting linear or rotary actuator are formed by at least one of: electromagnetic drives, linear electromagnets, or other electromotive drives; and wherein the two linear or rotary actuators operating in opposite directions or the double-acting linear or rotary actuator are electromotively and/or electromagnetically actuable by an electromagnetic or an electromotive driving force and wherein the two linear or rotary actuators operating in opposite directions or the double-acting linear or rotary actuator produce an actuating connection between the carrier vehicle and the boom, the two linear or rotary actuators operating in opposite directions or the double-acting linear or rotary actuator influencing a present angular position of the boom about the rotation axis based on the control signals from the control unit,
and wherein the two linear or rotary actuators operating in opposite directions or the double-acting linear or rotary actuator comprises two actuating drive sides, and a defined differential force is settable between the actuating drive sides,
and wherein the control unit is operable to monitor a resulting differential force between the two linear or rotary actuators operating in opposite directions or the double-acting linear or rotary actuator, wherein the resulting differential force is detected by at least one force sensor and the control unit is operable to automatically maintain the resulting differential force to the settable defined differential force to change the angular position of the boom.

2. The device as recited in claim 1, in which the at least one sensor arrangement for detecting the angular velocity and/or the angular position of the boom about the rotation axis in relation to the reference plane comprises at least one angular rate sensor, rotational angular velocity sensor, and/or angular acceleration sensor arranged at the boom.

3. The device as recited in claim 1, in which the at least one sensor arrangement for detecting the angular velocity and/or the angular position of the boom about the rotation axis in relation to the reference plane comprises at least one angular rate sensor, rotational angular velocity sensor, and/or angular acceleration sensor arranged at the carrier vehicle.

4. The device as recited in claim 1, wherein the actuating drive sides of the two linear or rotary actuators operating in opposite directions or the double-acting linear or rotary actuator are actuatable for each of two rotational shifting directions of the boom.

5. The device as recited in claim 4, in which a substantially equal level of force is applied at the two actuating drive sides of the two linear or rotary actuators operating in opposite directions or the double-acting linear or rotary actuator when the boom is stationary.

6. The device as recited in claim 4, in which the defined differential force is settable between the two actuating drive sides of the two linear or rotary actuators operating in opposite directions or the double-acting linear or rotary actuator when the boom is rotationally shifted in relation to the carrier vehicle.

7. The device as recited in claim 1, wherein the actuating drive sides of the two linear or rotary actuators operating in opposite directions or the double-acting linear or rotary actuator are actuatable by the electromotively or electromagnetically generated driving force for a specified shifting direction of the boom.

8. The device as recited in claim 7, in which a substantially equal level of force is applied at the two actuating drive sides of the two linear or rotary actuators operating in opposite directions or the double-acting linear or rotary actuator when the boom is stationary.

9. The device as recited in claim 7, in which the defined differential force is settable between the two actuating drive sides of the two linear or rotary actuators operating in opposite directions or the double-acting linear or rotary actuator when the boom is rotationally shifted in relation to the carrier vehicle.

10. A method for controlling the device as recited in claim 1, the method comprising regulating the angular position of the boom rotatable about the axis of rotation relative to the carrier vehicle based on the detected angular position and/or the measured differential force between the actuating drive sides of the two linear or rotary actuators operating in opposite directions or the double-acting linear or rotary actuator,
wherein when the boom is stationary, the measured differential force is substantially zero and the two linear or rotary actuators operating in opposite directions or the double-acting linear or rotary actuator builds substantially no actuating power between the carrier vehicle and the boom,
and wherein when the boom is to be shifted, the definable differential force builds up between the two actuating drive sides,
wherein a present angular velocity and/or the present angular position of the boom about the rotation axis in relation to the reference plane is determined by means of the at least one sensor arrangement,
which comprises an angular rate sensor, a rotational angular velocity sensor, and/or an angular acceleration sensor arranged at the boom or at the carrier vehicle.

11. The method as recited in claim 10, in which both the angular velocity and/or the angular position measured by the at least one sensor arrangement and the measured differential force between the two actuating drive sides of the two linear or rotary actuators operating in opposite directions or the double-acting linear or rotary actuator are used for determining the present angular position and/or a target angular position between the boom and carrier vehicle and are processed by the control unit, which controls the two linear or rotary actuators operating in opposite directions or the double-acting linear or rotary actuator.

\* \* \* \* \*